(12) United States Patent
Maissen (10) Patent No.: US 7,405,095 B2
(45) Date of Patent: Jul. 29, 2008

(54) METHOD FOR PRODUCING COLOR-WHEEL SEGMENTS

(75) Inventor: Clau Maissen, Truebbach (CH)

(73) Assignee: OC Oerlikon Balzers AG, Balzers (LI)

( * ) Notice: Subject to any disclaimer, the term of this patent is extended or adjusted under 35 U.S.C. 154(b) by 138 days.

(21) Appl. No.: 11/037,437

(22) Filed: Jan. 18, 2005

(65) Prior Publication Data

US 2005/0180036 A1 Aug. 18, 2005

Related U.S. Application Data

(60) Provisional application No. 60/537,726, filed on Jan. 20, 2004.

(51) Int. Cl.
*H01L 21/00* (2006.01)

(52) U.S. Cl. .................. 438/33; 359/891; 359/892; 353/84; 348/743; 356/418; 352/293

(58) Field of Classification Search ................ 359/891, 359/892; 353/84; 229/4.5; 427/109; 348/743; 356/418; 362/293

See application file for complete search history.

(56) References Cited

U.S. PATENT DOCUMENTS

| | | | | |
|---|---|---|---|---|
| 3,038,206 A | * | 6/1962 | Eccles | 264/160 |
| 3,547,336 A | * | 12/1970 | Jacke | 229/125.25 |
| 3,979,566 A | * | 9/1976 | Willy | 381/401 |
| 4,562,093 A | * | 12/1985 | Mario et al. | 427/109 |
| 5,130,174 A | * | 7/1992 | Esposito | 428/156 |
| 5,229,182 A | * | 7/1993 | Eisman et al. | 428/80 |
| 5,238,097 A | * | 8/1993 | Kanbe et al. | 193/27 |
| 5,371,543 A | * | 12/1994 | Anderson | 348/270 |
| 5,709,920 A | * | 1/1998 | Danton | 428/68 |
| 5,826,786 A | * | 10/1998 | Dickert | 229/403 |
| 6,253,995 B1 | * | 7/2001 | Blok et al. | 229/403 |
| 6,264,199 B1 | * | 7/2001 | Schaedel | 273/157 R |
| 6,598,977 B1 | * | 7/2003 | Chen | 353/31 |

(Continued)

FOREIGN PATENT DOCUMENTS

DE 34 00 843 7/1985

(Continued)

OTHER PUBLICATIONS

Patent Abstracts of Japan, Bd. 1997, Nr. 06, Jul. 30, 1997 & JP 09 045119, Feb. 14, 1997.

*Primary Examiner*—Matthew S. Smith
*Assistant Examiner*—Ankush k Singal
(74) *Attorney, Agent, or Firm*—Pearne & Gordon LLP (57) ABSTRACT

A method for producing from a plate-shaped substrate circular sections for use for instance in a color wheel encompasses inter alia such steps as positioning predefined edge break lines in such fashion that the circular sections to be separated at a subsequent point are arranged in columns, with the circular sections within a column being so positioned relative to one another that in each case at least certain points of the inner annular edge are in contact with the outer annular edge of another circular section, thus forming part of a common predefined edge break line, while the orientation of the curvature of the circular sections of neighboring columns is reversed in alternating fashion. In a subsequent step the circular sections are separated along the predefined edge break lines.

15 Claims, 7 Drawing Sheets

U.S. PATENT DOCUMENTS

| | | |
|---|---|---|
| 6,679,622 B1 * | 1/2004 | Kao .......................... 362/567 |
| 6,896,376 B2 * | 5/2005 | Chin et al. ................... 353/84 |
| 2005/0285981 A1 * | 12/2005 | Wang et al. ................. 348/753 |
| 2006/0132510 A1 * | 6/2006 | Bell et al. ................... 345/691 |
| 2006/0191174 A1 * | 8/2006 | Graham ...................... 40/306 |
| 2007/0099531 A1 * | 5/2007 | Efremova et al. ........... 442/370 |
| 2007/0108885 A1 * | 5/2007 | Tsai et al. ................... 313/495 |
| 2007/0229683 A1 * | 10/2007 | Larson et al. ............... 348/269 |

FOREIGN PATENT DOCUMENTS

| | | |
|---|---|---|
| DE | 100 16 628 | 10/2001 |
| GB | 647 714 | 12/1950 |
| IT | 1 240 961 | 12/1993 |
| SU | 1 159 901 | 7/1985 |

* cited by examiner

METHOD FOR PRODUCING COLOR-WHEEL SEGMENTS

BACKGROUND OF THE INVENTION

This invention relates to color wheels for projection systems and to a method for producing color wheels.

The invention pertains to a color wheel of the type employed in generating sequential color images using projection equipment. Such a color wheel can be produced by appropriately coating and configuring a disk-shaped glass substrate. It is especially the configuration process, however, that is expensive. In practice, therefore, a color wheel is in most cases composed of circular sections. It is typically produced by separating ring sectors or circular sections from dichroic plates and attaching them on a rotary disk in such fashion that the outer regions of the circular sections protrude past the rim of the disk and the outer edges of the circular sections form an annular circle. The color wheel thus produced, when to be used, is positioned in the optical path of an illuminating beam which, depending on the optical characteristics of the circular section currently in the optical path, will be transmitted or reflected for instance as a function of the wavelength concerned. Rotating the wheel makes it possible to generate a sequence of different colors.

This invention also relates to a method for producing the circular sections for use in a color wheel. For a more comprehensible description of this invention the following will identify and define some of the geometric parameters of the circular sections with reference to FIG. 1. A standard circular section 3 is circumscribed by an outer annular edge 5, an inner annular edge 7 as well as two radial edges 9, 9' that enclose the central angle $\phi$ and extend in a direction perpendicular to the outer and inner annular edges 5, 7. For the purposes of this invention the outer annular edge 5 is divided into a central circular arc section 11 and two lateral circular arc sections 13 and 13' in such fashion that the chord to the central circular arc section 11 is of the same length as the chord to the inner annular edge 7 and that the two lateral circular arc sections 13, 13' are of an identical length.

It is not generally possible to completely and fully cover a two-dimensional area with identical circular arc sections. As an inevitable result, the separation of such circular sections from plate material cannot make full use of all the material, i.e. parts thereof are wasted and the material yield is less than 100%. The plate material is usually preprocessed involving expensive procedures. For example, the plates used in making color wheels are first vacuum-coated. Maximum utilization of the material is therefore desirable. Another factor that further reduces material utilization in the separation process and that depends on the method by which the plate material is separated into circular sections, is the need for the individual circular sections to be more or less spaced apart so that clean, reproducible edges can be obtained. A widely used method for separating substrates from glass plates involves a scoring and breaking process (the S&B method). The surface of the plate material is first scored along the line of the intended edge and the glass is then broken along that line. There must be enough material on both sides of the scored line to permit the application of the force necessary for breaking it and making sure that the break actually follows the line of the intended edge. In that context, enough material means at least three times the thickness of the glass to be broken. If the glass is 1 mm thick, the circular arc sections must consequently be spaced at least 3 mm from the respectively neighboring circular arc section over its entire circumference, unless the circular sections share a common break line.

Accordingly, in order to increase the yield, an attempt is made to position the substrates that are to be cut out by appropriate separation on the plate material from which they are to be obtained, in such fashion that as many joint break lines as possible are produced. That, of course, depends in large measure on the intended geometric shape of the separated sections. For identical circular arc sections the only possibility is to position a radial edge of a first circular arc section so as to coincide with a radial edge of another circular arc section. If the curvatures of circular arc sections are aligned in matching fashion, additional circular sections can be positioned along the free radial edges, provided they are not more or less completely closed circular arc sections and provided the size of the plate permits it. The circular sections thus form an undulating, serpentine strip. This method is therefore referred to below as the serpentine method.

Another possibility to produce joint cutting edges and thus to achieve a better yield is to use a modified circular section, assuming the application permits it. As an example in the case of the color wheel described, the inside center area of the circular sections is used for the mechanical mounting only, thus allowing the inner annular edge to be varied as necessary.

Figure 1:
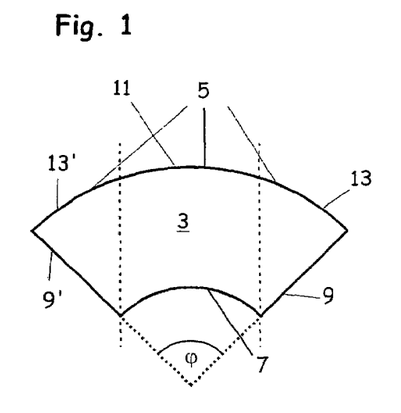
FIG. 1 is a diagrammatic illustration of a circular section.
Figure 2:
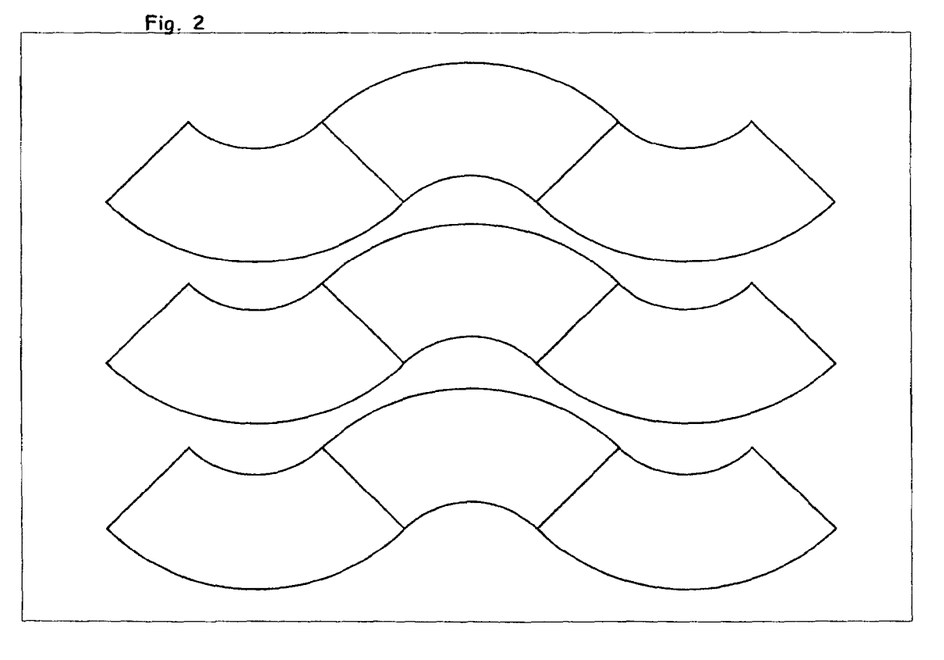
FIG. 2 shows the placement of the circular sections on a plate material along the serpentine method.
Figure 3:
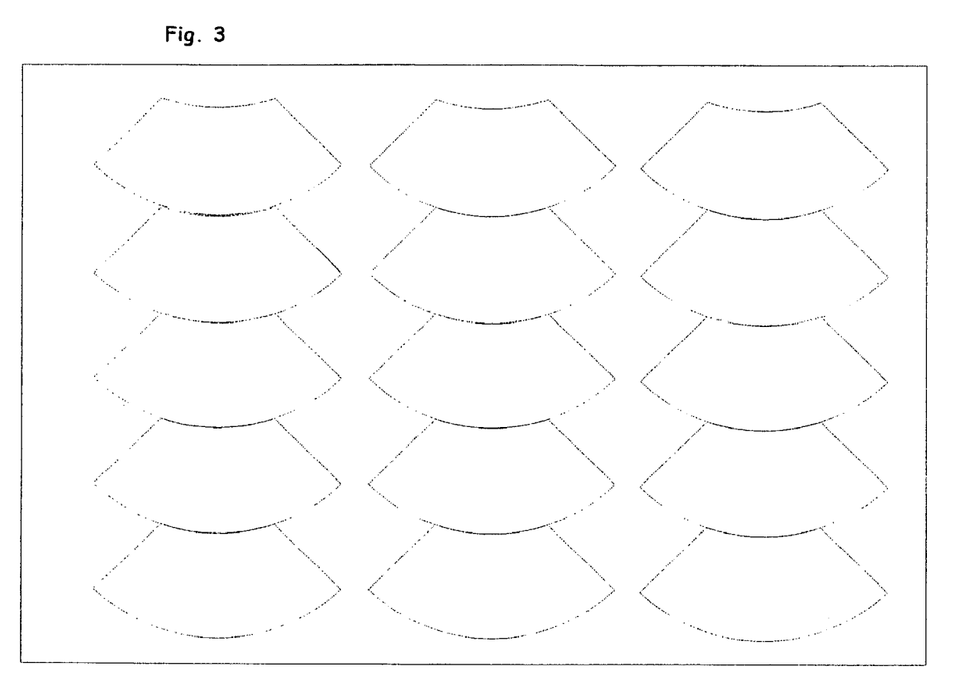
FIG. 3 shows the placement of the circular sections along the columnar method.

A desirably modified circular section features an inner annular edge whose curvature matches the outer annular edge. In that case the circular sections can be so positioned that the inner annular edge 7 of a circular section constitutes a common edge break line with the central section 11 of the outer annular edge 5 of another circular section. The circular sections will thus form columns in which they are positioned one above the other. This process is therefore referred to below as the columnar method.

Applying the columnar method by which the inner annular edge is adapted, only a small part of the perimeter shares a joint break line intended to minimize material loss. For the remainder of the perimeter, at least three times the distance to the break line must be allowed to permit proper breaking. Since in most cases the plate material used for the segmentation is preprocessed by a preceding, cost-intensive coating procedure, this loss of material is still a significant factor in terms of the manufacturing cost.

It is the objective of this invention to introduce a solution that overcomes the shortcomings of prior art.

Simply combining the serpentine method and the columnar method will not work: The technician who tries to apply the serpentine method by moving the undulations closer together will fail due to the fact that parts of the outer edges of the mutually adjoining circular sections have a differently oriented curvature, so that a common break line is not possible even in the case of a relatively unencumbered configuration of the inner annular edge.

The technician who, by applying the columnar method along the concept of the serpentine method, tries to align the radial break lines of one column with the radial break lines of another column will fail due to the fact that the circular sections would overlap.

BRIEF SUMMARY OF THE INVENTION

According to this invention, the problem is solved by modifying both the serpentine method and the columnar method in a manner as to make a combination possible starting with a placement along the columnar method, the first step is to alternate the orientation of the curvature of the circular sections in neighboring columns. That already makes it possible, in due consideration of the spacing needed for the separation, to move the columns closer together than in the original columnar method. The columns are thus interlaced to a degree. In a next step the columns are staggered in a way as to permit still closer interlacing. This should progress to a point where the radial edges of neighboring columns form common edge break lines, with the columns meshing tightly. The components of the radial edges and of the outer annular edge that do not form a common break line with other circular arc sections, together in each case with 3 other circular sections, will enclose a resulting loss area that cannot be utilized. To maximize the material yield that area should be held to a minimum for as long as the requirements of the process are and can be met. For example, the S&B process must maintain a spacing of at least three times the thickness of the plate.

A particularly advantageous implementation of this invention is practicable whenever the application permits a modification of the outer annular edge of the circular section. In that case it is possible to tightly interlace the columns and all of the modified circular sections can be positioned on the plate material with common break lines, eliminating any loss of material that would have to be removed.

BRIEF DESCRIPTION OF THE SEVERAL VIEWS OF THE DRAWINGS

The following will explain this invention in more detail by means of a few different implementation examples and with reference to the attached drawings in which—

DETAILED DESCRIPTION OF THE INVENTION

As can be seen, the serpentine method and the columnar method can only be combined by means of the inventive step involving only a partial butting of the radial break lines. Essentially, this can be done in one of two ways: i) Juxtapositioning the radial break lines only to a point where a loss area is intentionally created just large enough to permit the separation (for instance by the S&B method).

ii) A circular section approach is used that employs a modified outer annular edge.

Re i) Example of a Minimized Loss Area

In this example, circular sections are to be obtained from a plate material 1 mm thick. The plate material in this example is a glass plate coated with a color filter for a color wheel. The circular sections to be produced have an outer annular edge with a 40 mm radius of curvature. The central angle is 90°. The radial edges have a length of 22 mm each. The application of the color wheel is such as to permit the curvature of the inner annular edge to be adapted to the curvature of the outer annular edge.

Figure 4:
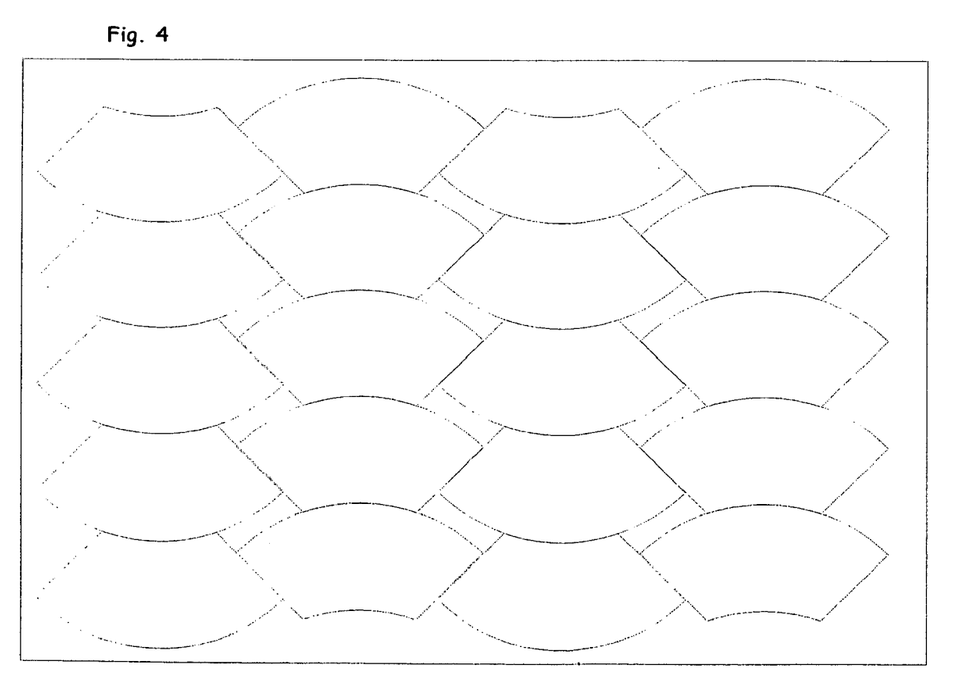
FIG. 4 shows the placement of the circular sections in accordance with a first form of implementation of the invention.
Figure 5:
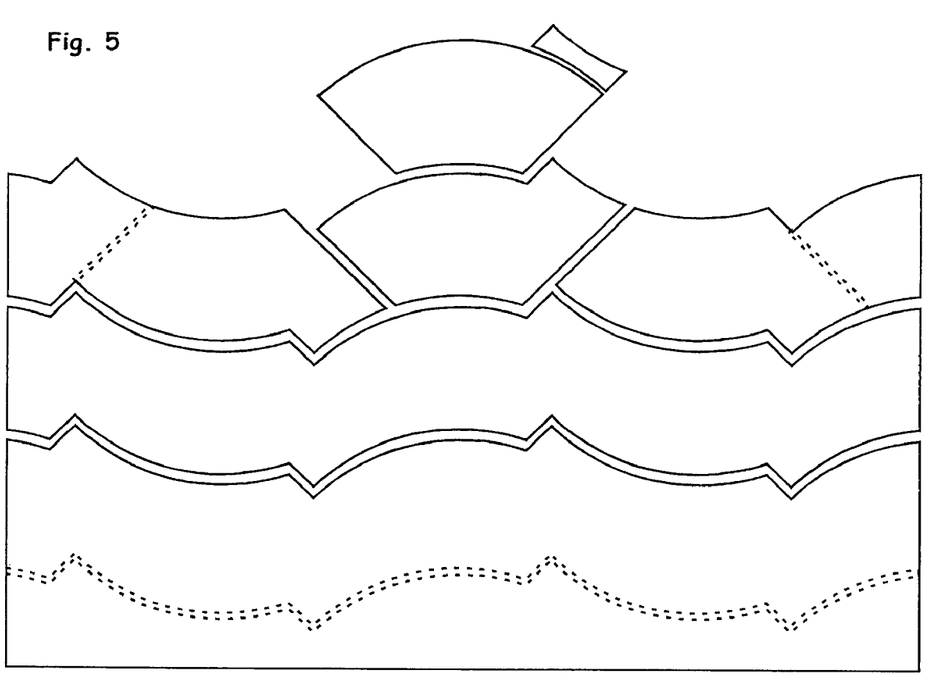
FIG. 5 schematically depicts an example of how the edge break lines can be configured on a plate.

In the example according to the invention, circular sections are positioned in close juxtaposition along the columnar method, in which case the curvature of the circular sections of two neighboring columns is oriented in mutually opposite directions. The radial edges of the circular sections of neighboring columns are positioned next to one another in such fashion that actually only 15.5 mm of their overall length of 22 mm make contact. The remaining 6.5 mm of the radial edges do not bound on another circular section. The result of that arrangement is schematically shown in FIG. 4. As a first step, modified serpentine strips are cut out of the glass plate. FIG. 5 shows level by level the various separation steps. The bottom level represents the glass plate in the lower part of which the dotted line indicates a predefined breaking edge. The level above that represents a serpentine strip already broken along the line of the predefined edge. The next level up shows another step of the separating phase in the form of a circular section that still includes a loss area. The break lines for additional circular sections on the same level are shown as a dotted outline only. One level up from there is a completely separated circular section with the loss area severed. The loss area is double-concave, its narrowest point being more than 3 mm wide, which is more than four times the thickness of the plate. That allows it to be easily and dependably separated from the circular section by the S&B method.

ii) Modified Circular Section

Figure 6A:
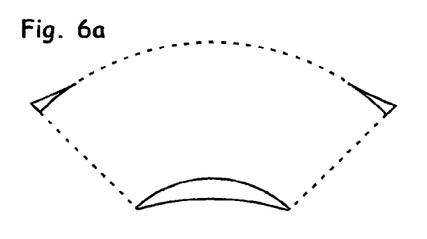
FIG. 6 illustrates the arrangement of circular sections where the outer annular edge is modified in a way as to eliminate loss of material.
Figure 6B:
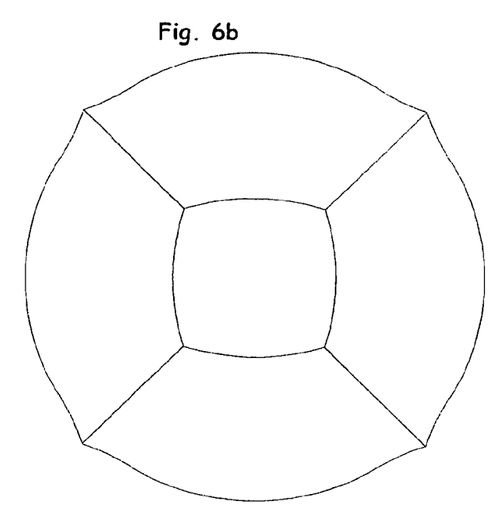
Figure 6C:
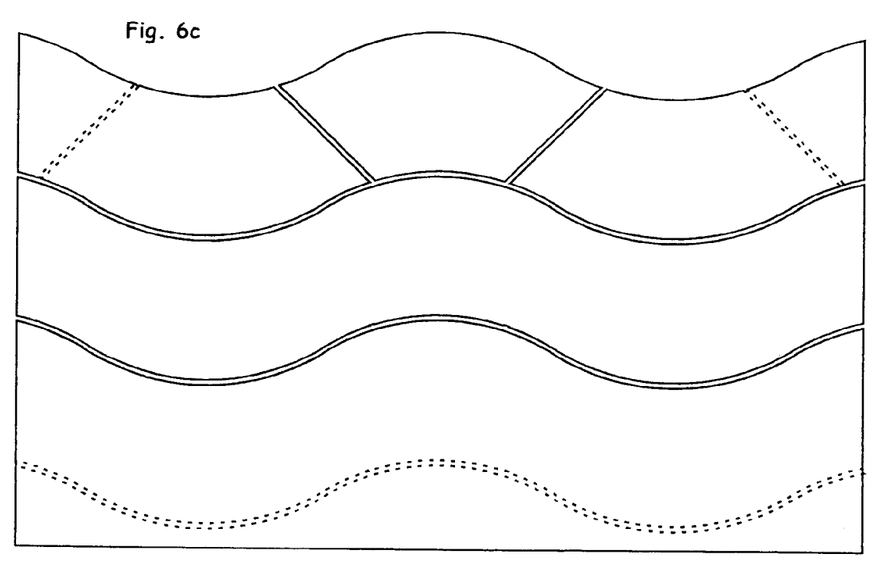

The fact that for the optical application of a color wheel the geometry of the outer rim is ultimately of no particular consequence can be used to advantage in the production process. FIG. 6a shows a circular section with a modified outer annular edge. The dotted outline represents the original circular section. The area defined by a solid line constitutes the components that have been added compared to the original circular section. FIG. 6b schematically depicts a wheel composed of such modified circular sections. FIG. 6c illustrates at different levels on a glass plate the individual separating steps. First, a serpentine strip is broken out of the glass plate. Its as yet unbroken state is represented on the bottom-most level by a dotted line. The level above that depicts the broken-out strip. Illustrated on the top level are the break lines along the radial edges. For one circular section the break is shown as completed while for other circular sections the predefined edge break lines are merely indicated by dotted lines. There are no loss areas. Moreover, the absence of corners greatly facilitates the S&B process with a direct positive effect on the yield.

As is evident in FIG. 6a, this production method leads to an elongation of the radial edges. For a color wheel composed of circular sections identical in area size that poses no problem. More commonly,. however, wheels are assembled from circular sections having different central angles. For example, a color wheel used for projection purposes typically contains red, blue, green and fully transparent circular sections with central angles that differ as a function of the color density. In that case, modifying the circular sections in accordance with the invention will lead to different elongations of the radial edges, i.e. compared to the adjoining circular section they may possibly protrude in pointed fashion or they may be set back. Protrusions of that kind make the color wheel susceptible to mechanical stress.

Figure 7A:
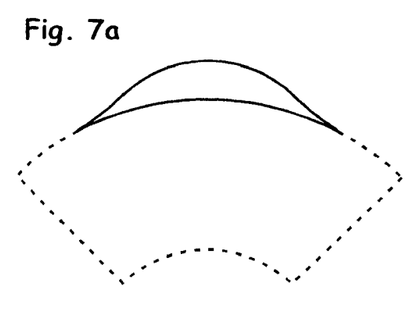
FIG. 7 shows another configuration according to the invention, in which the length of the radial edges corresponds to that of the original circular segment.
Figure 7B:
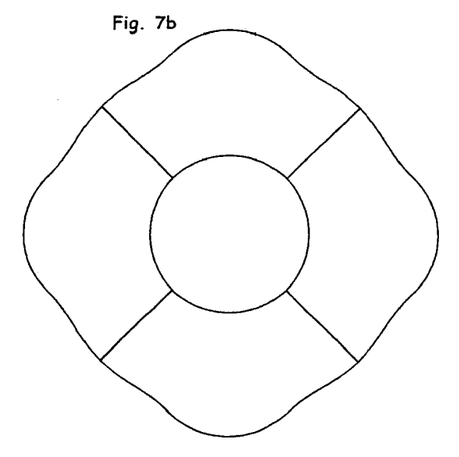
Figure 7C:
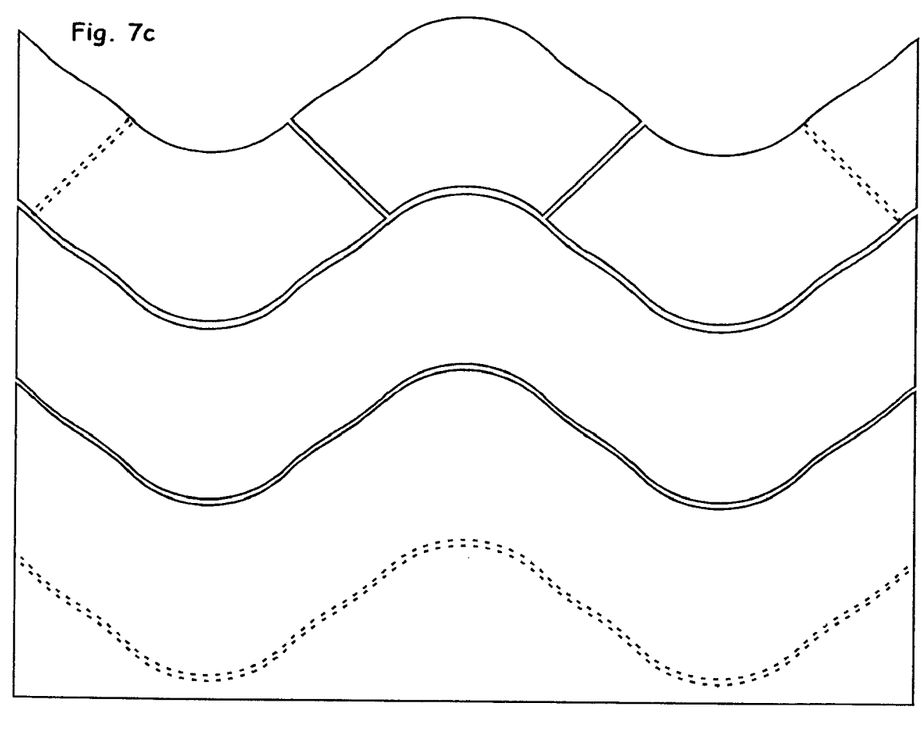

To avoid that, another form of implementation of the invention retains the radial edge but modifies the curvature of only the outer circular arc section. FIG. 7a shows a circular section thus modified, selecting for this example a version whereby the inner annular edge actually still forms a circle when these circular sections are assembled into a color wheel as illustrated in FIG. 7b. FIG. 7c again shows at the various levels the individual separating steps.

Figure 8A:
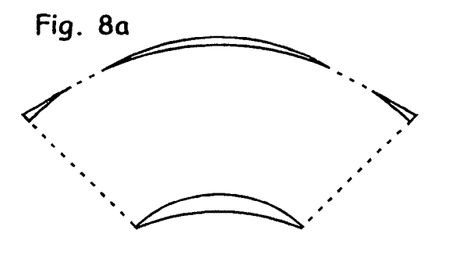
FIG. 8 depicts another form of implementation.
Figure 8B:
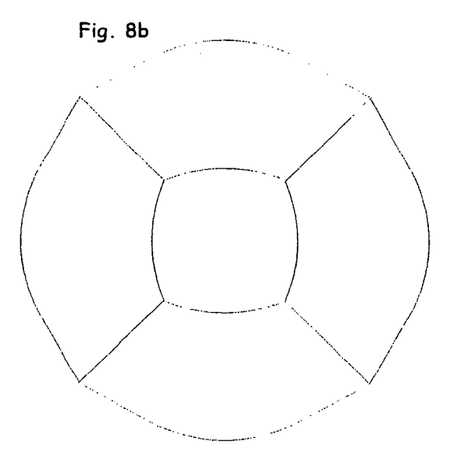
Figure 8C:
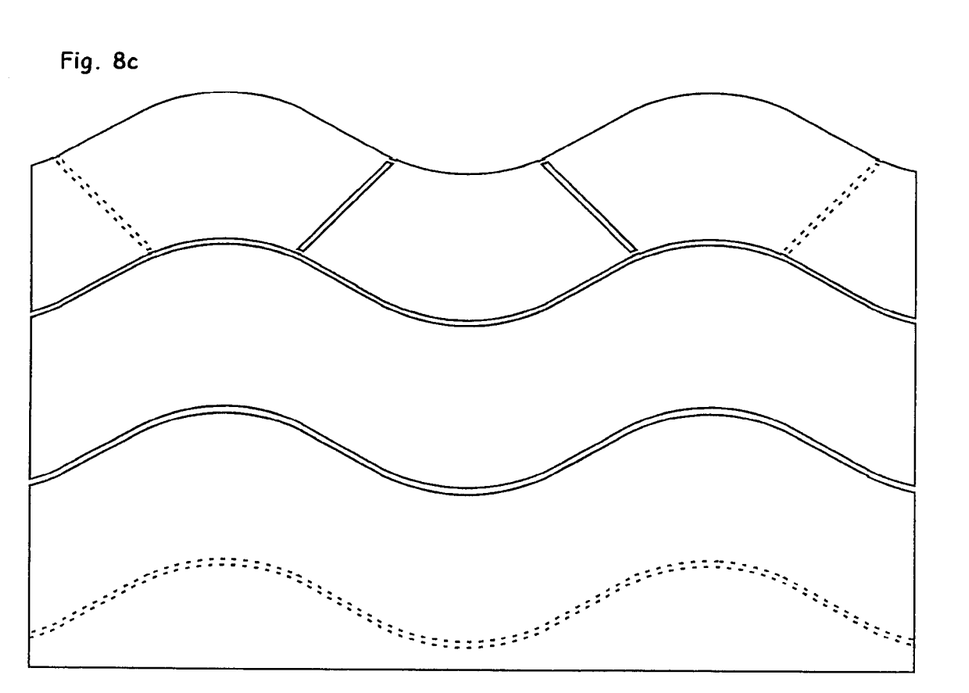

The color wheel configured as shown in FIG. 7 may create the impression that it deviates rather strongly from the original wheel geometry after all. It should be pointed out, however, that this is only given as an example and that it is entirely possible to combine configurations per FIG. 6 and FIG. 7 to arrive at the same radial edge length for all circular sections without an excessive departure from the geometry of the wheel. One such example is illustrated in FIG. 8. The correspondingly modified circular section is shown in FIG. 8a in which the areas that have been added to the original circular section are identified by a solid outline. FIG. 8b is a schematic illustration of a color wheel composed of such circular sections, and FIG. 8c shows the individual separating steps at the various levels.

Figure 9A:
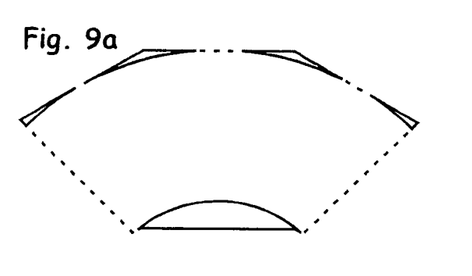
FIG. 9 shows a configuration with all straight break line segments.
Figure 9B:
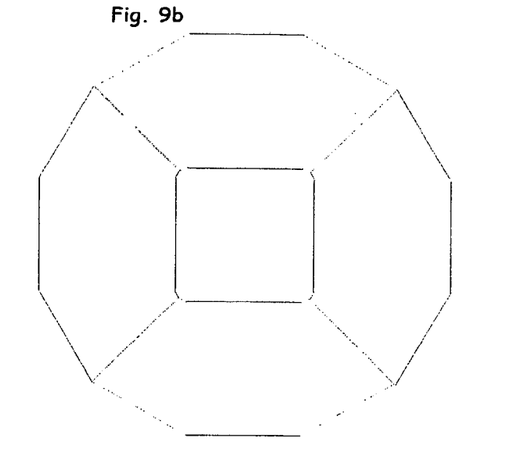
Figure 9C:
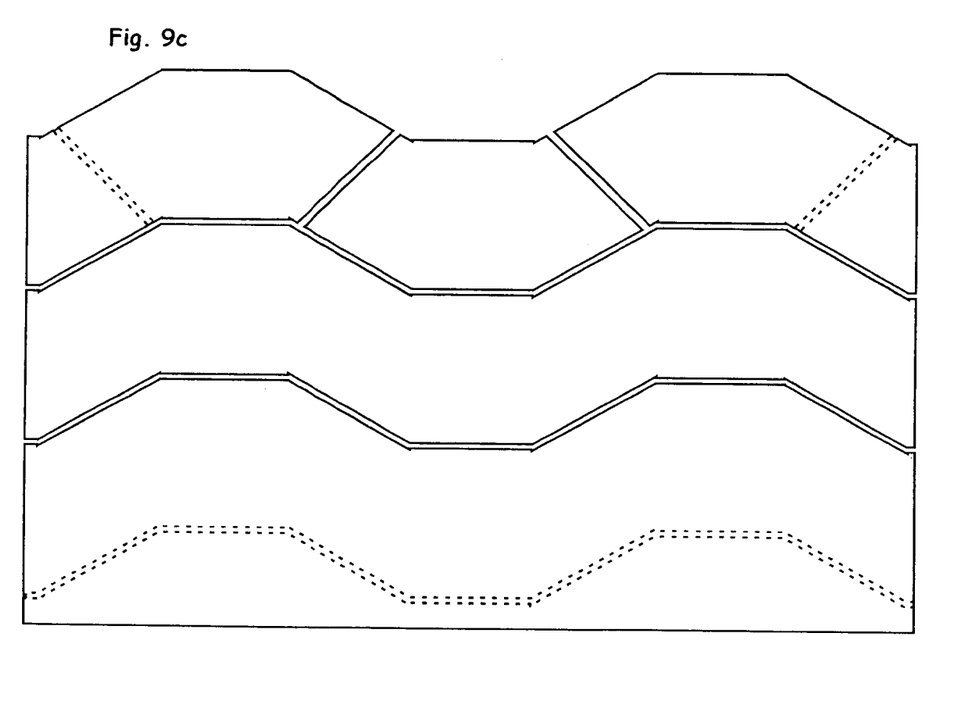

The break lines described thus far are all of a more or less curved geometry. In the case of some separating methods, however, producing such curved edges is a fairly difficult matter. Especially when a separating process is to be automated, an edge break line that deviates from a circular arc can pose a substantial technical challenge. Modifying the circular sections in accordance with this invention, where permitted by the intended application, makes it possible to work with break lines containing strictly linear segments. One such design implementation is shown in FIG. 9. FIG. 9a illustrates a modified circular section, FIG. 9b a wheel composed of such circular sections while FIG. 9c shows the individual separating steps at the various levels.

For some applications the outer contour of the wheel is of significance, albeit not optical in nature. For example, in practical use the color wheel rotates at more than 80 Hz, typically about 120 Hz. Deviations from the circular contour can be expected to engender air turbulences which in turn can generate noise. To counter such a phenomenon, it is possible to embed the wheel in a circular outer frame, which may even serve as an added stabilizer for the circular sections vis-a-vis any centrifugal force.

The invention claimed is:

1. Method for producing a wheel from circular sections manufactured from a plate-shaped substrate, employing the following steps:
    positioning of predefined edge break lines in a manner whereby in a subsequent operation they serve to separate circular sections in a columnar arrangement,
    wherein within a column the circular sections are so positioned relative to one another that in each case at least certain points of the inner annular edge (7) of a given circular section is in contact with the outer annular edge (5) of another circular section, thus forming a segment of a common predefined edge break line,
    and the orientation of the curvature of the circular sections of neighbouring columns extends in alternating fashion and neighbouring columns are interlaced,
    wherein the interlacing is limited to a degree that one or multiple loss areas result,
    breaking the circular sections along the break lines, and
    joining the circular sections along their radial edges into a two-dimensional wheel.

2. Method as in claim 1, characterized in that segments of the radial break lines of neighboring columns form common edge break lines.

3. Method as in claim 2 characterized in that radial edges of neighbouring columns form common sections.

4. Method as in claim 1, characterized in that the entire edge break line of the inner annular edge (7) of a circular section constitutes part of the predefined edge break line of the outer annular edge (5) of an adjoining circular section.

5. Method as in claim 1, characterized in that the inner annular edge (7) of a circular section forms a continuous, directly contiguous line with the outer annular edge (5) of a circular section of a neighboring column.

6. Method as in claim 5, characterized in that the radial edges (9, 9') of a circular section include a central angle phi and that the curvature of the outer annular edge is so modified that the length of the radial edges remains essentially unchanged when the central angle is varied.

7. Method as in claim 1, characterized in that the contour of the outer annular edge and, where applicable, the inner annular edge as well is so modified that several columns of separated, modified circular sections together can cover an area in solid fashion.

8. Method as in claim 1, characterized in that the inner (7) and the outer annular edge (5) of a circular section include linear segments.

9. Method as in claim 1, characterized in that the wheel is a color wheel.

10. Method as in claim 1, whereby the circular sections are embedded in a frame.

11. Method as in claim 1 characterized in that the resulting loss areas have a minimum dimension of at least three times the thickness of the plate-shaped substrate.

12. Method as in claim 1 characterized in that radial edges of neighbouring columns form common sections.

13. Method as in claim 1, characterized in that the entire edge break line of the inner annular edge (7) of a circular section constitutes only part of the predefined edge break line of the outer annular edge (5) of an adjoining circular section.

14. Method as in claim 1 wherein the substrate is a rigid material.

15. Method as in claim 1 wherein the substrate is glass.

* * * * *